A. WAHLSTROM.
FEEDING APPARATUS FOR POULTRY.
APPLICATION FILED OCT. 17, 1912.

1,098,069.

Patented May 26, 1914.

2 SHEETS—SHEET 1.

WITNESSES
F. C. Fliedner
S. Constine

INVENTOR
Axel Wahlstrom
BY
N. A. Acken
ATTORNEY

COLUMBIA PLANOGRAPH CO., WASHINGTON, D. C.

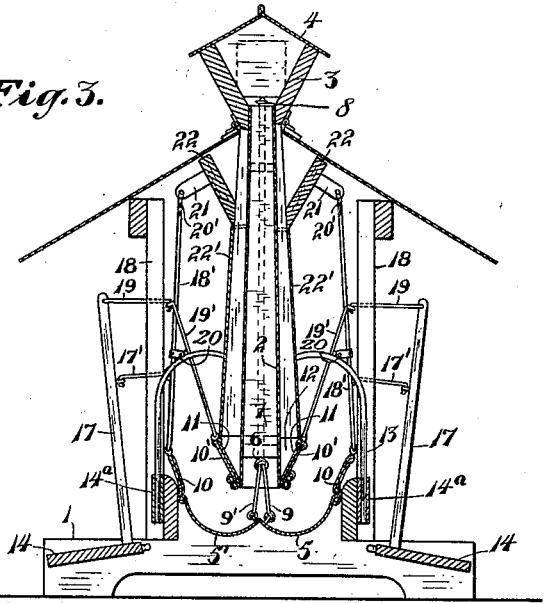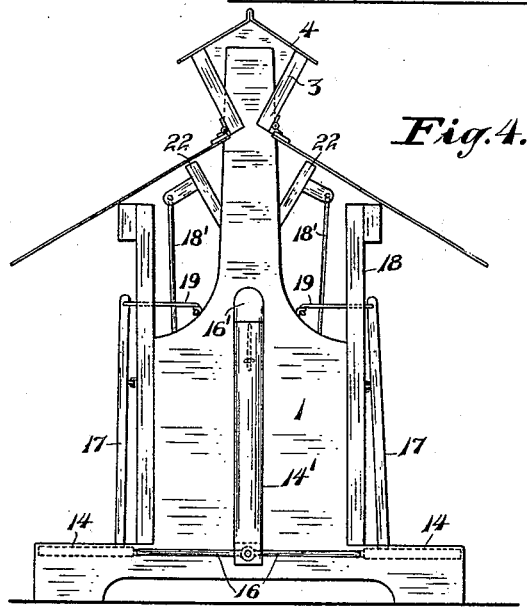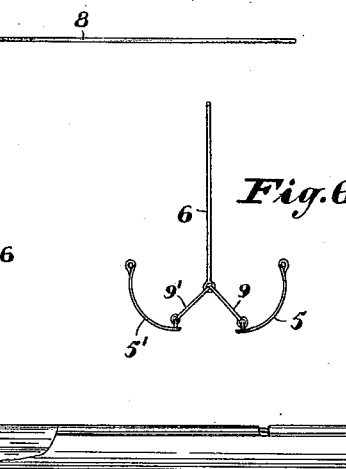

UNITED STATES PATENT OFFICE.

AXEL WAHLSTROM, OF OAKLAND, CALIFORNIA.

FEEDING APPARATUS FOR POULTRY.

1,098,069.  Specification of Letters Patent.  Patented May 26, 1914.

Application filed October 17, 1912. Serial No. 726,325.

*To all whom it may concern:*

Be it known that I, AXEL WAHLSTROM, a citizen of the United States, residing at Oakland, in the county of Alameda and State of California, have invented certain new and useful Improvements in Feeding Apparatus for Poultry, of which the following is a specification.

The present invention relates to a sanitary apparatus designed more especially for the feeding of poultry, although its use is not so restricted, the same being simple of construction, inexpensive as to manufacture, effective in operation, and durable, and whereby the food supply is automatically delivered into the feeding trough as removed therefrom during the feeding operation of the poultry; the object being the production of a feeder whereby the weight of the fowls uncovers the feed trough for exposing to view the food product, the arrangement of the working parts being such as to provide against the scattering and wasting of the food product, the feed trough being maintained closed except at such times as the fowls are feeding therefrom, thereby protecting the food from rats, rodents and such small animals as generally exist in the vicinity of chicken ranches and live on the food provided for the poultry. By the use of the hereinafter described invention such waste and loss of the food product is provided against, inasmuch as access can only be obtained to the feed trough when the covers thereof are swung open, and this takes place only when the fowls are standing on the actuating platform for the same.

To comprehend the invention reference should be had to the accompanying drawings, wherein—

Figure 1:
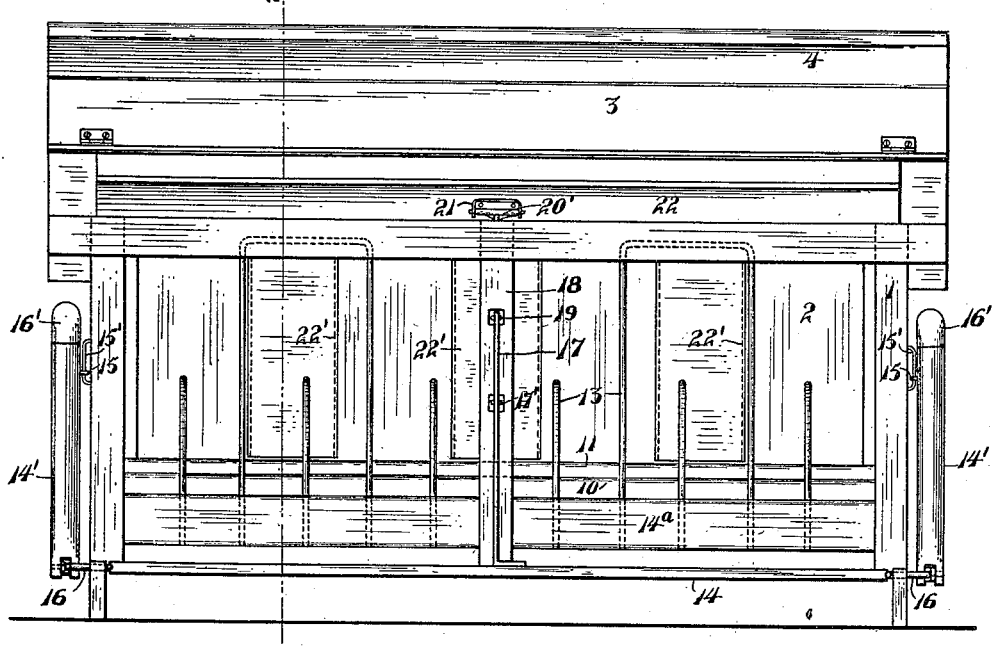
Figure 2:
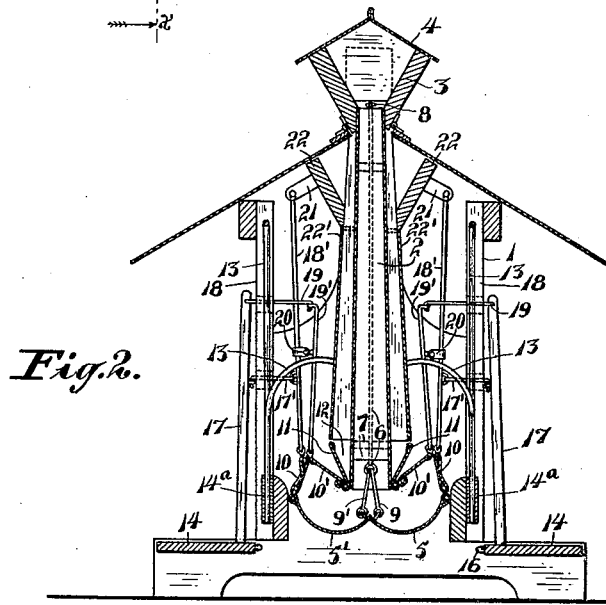

Figure 1 is a side view of the improved feeder, with one of its protecting covers in raised position. Fig. 2 is a cross sectional view taken on line $x$—$x$—Fig. 1 of the drawings, illustrating the feed trough as closed and the protecting cover lowered. Fig. 3 is a similar view disclosing the position of the actuating platform in lowered position and the swinging covers for the feed trough thrown open. Fig. 4 is an end elevation of the feeder. Fig. 5 is a detail view of the feed trough and the actuating rod for throwing the same in open position. Fig. 6 is an end view illustrating the trough in open position.

The illustrated apparatus discloses a double feeder for poultry, that is one so arranged that the fowls may feed at either side thereof. However, this is an immaterial feature of the apparatus, and as the working elements controlling the opening and closing of the feed trough is the same at each side of the apparatus, it will only be necessary to describe the working of the inter-connected parts at one side of the feeder for an understanding of the invention.

In the drawings, the numeral 1 is used to designate any suitable form of a frame structure, within which is arranged an open top and bottom receiving hopper 2, the walls of which are divergent downwardly in order that the passage-way for the reception of the food products may be somewhat wider at the bottom than at its upper or receiving end, this outward flare of the side walls of the hopper or reservoir 2 serves to prevent the clogging of the food product delivered therein and permits of free downward movement thereof. The food products, such as mash or grain is delivered into the reservoir or hopper 2 through the open bottomed guide trough 3 arranged immediately above the same and which constitutes a portion of the frame structure 1, and said trough is normally closed by a removable cap section 4, which protects the reservoir or hopper 2 against the admission of rain therein.

The lower end of the reservoir or hopper 2 is closed by two hinged downwardly swinging curved plates 5, 5', which are hinged to the end walls of the frame structure and when swung upwardly form feed troughs for the poultry, the inner edge of each swinging bottom plate meeting centrally of the open bottom of the reservoir or hopper and serving to direct the downwardly moving mass of food product to each side of the reservoir or hopper. These hinged curved plates are swung open and closed by an operating rod 6, which works within a vertically disposed guide 7 dividing the reservoir or hopper into two compartments, said curved plates when swung upwardly serving as feed troughs. The upper end of the operating rod 6 when pulled upwardly extends to within a slight distance of the guide 7, and to the same is connected pivotally an actuating handle 8, which, when thrown into a horizontal position lies within the guide trough 3 and holds the rod 6 in adjusted position for maintaining closed the swinging bottom plates 5 and 5′. The lower end of the operating rod 6 is connected to the swinging plates 5 and 5′ by means of the angularly disposed connecting links 9 and 9′.

Within the frame structure and to each side of the side walls of the reservoir or hopper (where a double feeder is constructed) the swinging coöperating cover plates 10 and 10′ are situated a slight distance above the curved feed trough plates 5 and 5′, the free edges of said cover plates when swung together completely closing the feed troughs and preventing access to the food held therein. The cover plates 10 are pivoted to the end walls of the frame structure, while the plates 10′, are hinged at their lower edge to a longitudinally disposed outwardly inclined plate 11 secured to each side wall of the reservoir or hopper 2 and by the inclination thereof form troughs 12 for the reception of grits, gravel, sand, shells or charcoal delivered thereto as hereinafter explained.

The end walls of the frame structure project slightly beyond the outer wall surfaces of the reservoir or hopper 2, and at each side of the said reservoir or hopper is placed a grating or guard formed preferably of thin spaced metallic rods 13, the distance between adjacent rods being sufficient to permit of the free insertion of the head and neck of a fowl in order that the beak thereof may project within the feed troughs formed by the curved plates 5 and 5′ on the cover plates 10 and 10′ being swung open, so that the food may be taken therefrom. In the present case there is arranged longitudinally at each side of the apparatus and a slight distance below the base strip 14ª for the grating or guard, an actuating platform 14, each of said platforms being pivotally mounted within the frame structure of the apparatus and normally held in raised position by means of the overbalancing weight movably held to the outer face of the end walls of the said frame structure. Preferably, these weights comprise a movable hollow tube or cylinder 14′ vertically disposed and held to the end wall of the frame structure by means of an eye 15 movably secured to the supporting bracket 15′ projecting slightly from the end walls and to the lower end of said cylinders are pivotally secured the crank arm extensions 16 of the operating platforms 14. The cylinders 14′ are closed by the caps 16′ and the interior of each cylinder is filled with gravel, sand, dirt or small stones until sufficient weight is obtained for the purpose of overbalancing the weight of the platforms 14 and such additional weight placed thereon as may be desired. From each operating platform upwardly extends an operating arm 17, which is connected at one portion by a link 17′ working through an opening in the upright 18 to a lever 18′ pivoted at its lower end to and upwardly extended from the cover plate 10 and by a similar link 19 working through a second opening in the upright 18 is connected to the upper end of a shorter lever 19′ pivoted at its lower end to and projecting upwardly from the hinged cover plate 10′. The lever 19′ is fulcrumed to a small bracket 20 secured to and inwardly projected from the lever 18′, which said lever in turn is secured at its upper end to a swinging plate 20′ hinged within the arms of a bracket 21 secured to an outwardly inclined longitudinally disposed plate 22 attached to the frame structure.

As one or more fowls step onto the hinged platform 14, the weight thereof overcomes that of the tubes or cylinders 14′, and swings downwardly the hinged platform. The result of this downward movement of the platform is to throw outwardly the arm 17, which through its connections with the levers 18′ and 19′ of the cover plates 10 and 10′ respectively, swings the said plates to uncover the troughs formed by the curved plates 5 and 5′, permitting the fowls to have free access to the food contained therein, which as consumed is automatically replenished by the down flow of the feed from within the reservoir or hopper 2. As the chickens or fowls step off the platform 14 the counter-balancing weights come into play and automatically swing upwardly the said platforms and through the described connections with the levers 18′ and 19′ throw the cover plates 10 and 10′ to close the feed troughs. The guard or grating arranged in advance of the hinged cover plates prevents the fowls getting into the feed troughs when the cover plates are opened and by scratching throwing the feed therefrom, and also serves to prevent the overcrowding of the fowls during feeding time.

To each outer wall surface of the reservoir or hopper 2, where a double feeder is provided, a series of downwardly extended chutes 22′ are secured, which extend from the inclined plate 22 to the lower longitudinally disposed plate 11, the said chutes being outwardly flared at their upper ends to completely close the space existing between the plates 22 and the wall surfaces of the reservoir or hopper 2. The plate 22 forms a guiding wall for the delivery of gravel, sand, charcoal or broken shells into the inclined mouths of the chutes 22′, the material filling the said chutes and the runway formed by the plate 11, leaving the same free to be eaten by the fowls at will.

To the upper frame work of the supporting structure and at each side of the feeding apparatus there is hinged an outwardly projected cover or roof section, which extends outwardly sufficiently far to act as a shed for protecting the fowls against rain while feeding from the apparatus.

In order to clean the troughs, it is only required to raise the handle 8 and force downward the operating rod 6, which through the medium of the link connections 9 and 9' causes the curved plates 5 and 5' to swing downward and open outwardly, to dump therefrom the material held therein.

The described feeding apparatus may be constructed of any given size for the feeding at one time of a large number of chickens or fowls, and the construction of the working parts is such that when the fowls are not feeding the feed troughs are maintained closed to such an extent that rats, field mice and other small grain eating animals cannot obtain access to the food, thereby preventing the waste and expense incident to such consumption of food.

While the apparatus has been described and illustrated in its preferred form, it is obvious that changes may be made in the construction of the working parts without creating a departure from the scope of the invention.

Having thus described the invention what is claimed as new and desired to be protected by Letters Patent is:—

1. In an apparatus for the described purpose, the combination with a frame structure provided with a vertically disposed feed hopper, a longitudinally disposed feed trough arranged beneath the feed hopper to receive material therefrom, cover means for said feed trough comprising a pair of plates hinged at their lower edges respectively to said trough and said feed hopper, a weight actuated platform for controlling the opening and closing movements of said cover plates relative to each other, and leverage connections between the weight actuated platform and the free edges of the respective cover plates for swinging the free edges thereof to and from each other in accordance with the movement of said platform.

2. In an apparatus for the described purpose, the combination with a frame structure, provided with a vertically disposed feed hopper, a longitudinally disposed feed trough arranged beneath the feed hopper to receive the material therefrom, cover means for said feed trough comprising a pair of plates hinged at their lower edges respectively to said trough and said feed hopper, a pivoted platform for controlling the opening and closing movements of said cover plates relative to each other, supporting means attached to the free edges of the respective cover plates, leverage connections between said platform and supporting means for swinging the free edges of said plates to and from each other in accordance with the movement of said platform, and weighted means associated with said platform for normally maintaining the free edges of said cover plates in engaged relation and closed position over said trough.

In testimony whereof I have signed my name to this specification in the presence of two subscribing witnesses.

AXEL WAHLSTROM.

Witnesses:
M. A. ACKER,
D. B. RICHARDS.

Copies of this patent may be obtained for five cents each, by addressing the "Commissioner of Patents, Washington, D. C."